United States Patent
Le et al.

(10) Patent No.: US 7,636,569 B2
(45) Date of Patent: Dec. 22, 2009

(54) METHOD OF REGISTERING HOME ADDRESS OF A MOBILE NODE WITH A HOME AGENT

(75) Inventors: Franck Le, Irving, TX (US); Stefano Faccin, Dallas, TX (US); Basavaraj Patil, Coppell, TX (US)

(73) Assignee: Nokia Corporation, Espoo (FI)

( * ) Notice: Subject to any disclaimer, the term of this patent is extended or adjusted under 35 U.S.C. 154(b) by 1264 days.

(21) Appl. No.: 10/609,016

(22) Filed: Jun. 27, 2003

(65) Prior Publication Data

US 2004/0029584 A1 Feb. 12, 2004

Related U.S. Application Data

(60) Provisional application No. 60/392,807, filed on Jun. 28, 2002, provisional application No. 60/393,323, filed on Jul. 1, 2002.

(51) Int. Cl.
H04M 4/00 (2006.01)
(52) U.S. Cl. ............... 455/435.1; 370/310.1; 370/395.3
(58) Field of Classification Search .............. 455/432.1, 455/435.1, 417, 423; 370/310, 331, 352, 370/386, 401, 395.31, 395.54, 395.3, 310.1
See application file for complete search history.

(56) References Cited

U.S. PATENT DOCUMENTS 6,445,922 B1 * 9/2002 Hiller et al. ................. 455/433
6,510,153 B1 1/2003 Inoue et al.
6,571,289 B1 5/2003 Montenegro ................. 709/227
7,079,499 B1 * 7/2006 Akhtar et al. ................ 370/310
7,447,173 B2 * 11/2008 Harris ......................... 370/328
2001/0036164 A1 * 11/2001 Kakemizu et al. ............ 370/331

(Continued)

FOREIGN PATENT DOCUMENTS

WO WO01/76134 A1 10/2001

(Continued)

OTHER PUBLICATIONS

Network Working Group; T. Narten et al.; "Privacy Extensions for Stateless Address Autoconfiguration in Ipv6, Request for Comments: 3041"; pp. 1-17; The Internet Society (2001).

(Continued)

Primary Examiner—Binh K Tieu
(74) Attorney, Agent, or Firm—Ware, Fressola, Van Der Sluys & Adolphson LLP

(57) ABSTRACT

A method for registering a home address of a mobile node with a home agent in a network. Instead of using the home address of the mobile node as the key element in identifying the mobile node, the home agent uses the network access identity of the mobile node included in a registration request sent by the mobile node to the home agent in the registration process. Upon receiving the registration request, the home agent authenticates the mobile node by selecting the appropriate security association based on the network access identity. In response, the home agent may send Authentication and Key material to the mobile node so as to allow the mobile node to further provide the home agent with a mobile node authentication for use in a challenge-response procedure.

27 Claims, 4 Drawing Sheets

U.S. PATENT DOCUMENTS

| | | | |
|---|---|---|---|
| 2002/0006133 A1* | 1/2002 | Kakemizu et al. | 370/401 |
| 2002/0120844 A1* | 8/2002 | Faccin et al. | 713/168 |
| 2003/0092425 A1 | 5/2003 | Okazaki et al. | 455/411 |
| 2003/0147537 A1* | 8/2003 | Jing et al. | 380/277 |
| 2003/0224788 A1* | 12/2003 | Leung et al. | 455/435.1 |
| 2004/0024901 A1* | 2/2004 | Agrawal et al. | 709/238 |
| 2004/0137888 A1* | 7/2004 | Ohki | 455/417 |

FOREIGN PATENT DOCUMENTS

| | | |
|---|---|---|
| WO | WO 01/76286 A1 | 10/2001 |
| WO | WO 02/43281 A1 | 5/2002 |

OTHER PUBLICATIONS

Network Working Group; S. Glass et al.; "Mobile IP Authentication, Authorization, and Accounting Requirements, Request for Comments: 2977"; pp. 1-27; The Internet Society (2000).

IETF Mobile IP Working Group; D. Johnson et al.; "Mobility Support in Ipv6"; pp. 1-167; Internet draft (May 2002).

End to End Mobility Support for Heterogeneous Internet Environments, Kunitake Kaneko, Hiroyuki Morikawa, Tomonori Aoyama and Masaya Nakayama, School of Engineering, The University of Tokyo 7-3-1 Hongo, Bunkyou-ku, Tokyo, 113-8656 Japan (Original Japanese document and English translation of the entire document).

* cited by examiner

METHOD OF REGISTERING HOME ADDRESS OF A MOBILE NODE WITH A HOME AGENT

This application is based on and claims priority under 35 U.S.C. §119(e) to U.S. provisional applications Ser. No. 60/392,807, filed Jun. 28, 2002, and Ser. No. 60/393,323, filed Jul. 1, 2002.

FIELD OF THE INVENTION

This invention is related to Mobile IPv6 and IP security.

BACKGROUND OF THE INVENTION

Mobile IPv6 (MIPv6) is a protocol developed to enable IP mobility in IPv6 networks for IPv6 hosts. Such a protocol allows a Mobile Node (MN) to maintain active TCP (Transmission Control Protocol) connections and UDP (User Datagram Protocol) port bindings while moving from one subnet to another. The current Mobile IPv6 model is based on the MN being assigned a static IP address as its HoA, e.g. at subscription time. When connected through a foreign network, the MN sends Binding Updates (BUs) to its Home Agent (HA) to indicate its current location information, or the Care-of-Address (CoA) that has been assigned to the MN at its current point of attachment. This information allows the HA to forward packets intended for the MN to the current location. BUs are secured by an IPsec security association (SA) that exists between the MN and the HA (e.g. set-up at subscription time). This IPsec SA is normally associated with the static HoA of the MN (source address), the Home Agent address, a Security Parameter Index (SPI) value and the value of the Next Header. The HA uses these parameters for each incoming packet to identify the correct SA to utilize. The IPsec engine in the MN and HA makes use of this SA in securing the BU and Binding Acknowledgment (i.e., in authenticating the MN sending the message and verifying the integrity of the message).

Currently, an MN provides the HA its Home IP Address to identify itself. In particular, this means that the HA processes the BU after the IPsec engine has validated the authenticity of the BU. Since the BU sent to the HA from an MN is secured by IPsec, the Mobile IP processing of the BU message in the HA is carried out only after the BU has been processed by the IPsec engine. The Mobile IP module only processes authenticated BUs because the responsibility of ensuring the authenticity is passed on to IPsec.

However, real deployment models and privacy issues may cause the MN to use techniques, such as those proposed in RFC3041, to generate a dynamic HoA instead of being assigned a static one. In such cases, since the MN is using a dynamic HoA, the MN needs first to register the dynamic HoA with its HA before the HA can start defending the HoA and forward incoming packets to the MN, and then send a BU message to the HA to create a binding cache for the CoA. In order to secure these messages (to avoid flooding of the HA), the MN has to prove its identity to the HA via an identifier that is not its IP address in order for the HA to accept the HoA being proposed by the MN (i.e., for the messages to successfully pass the processing of the IPsec engine). Only after the HA has accepted the HoA will a BU sent by the MN be processed by the MN.

Currently, in Mobile IP, there is no way for an MN to register a Home Address (HoA) dynamically created by the MN with an HA in a secure way. However, this missing procedure will soon be required to allow the deployment of CGA (Cryptographically Generated Address) solutions, or dynamic home address assignment procedures required in RFC 2977.

CGA and other proposed solutions define schemes to allow the MN to prove that it owns the claimed IP addresses (Home Address and Care-of Address). These solutions require that in some situations (e.g., for solutions that rely on public keys when the private key is corrupted), the MN computes a new Home Address and registers it with its home network; but as indicated above, such a procedure does not exist, yet. Alternatively, the presence of some infrastructure (such as AAA servers) can be relied upon. Also the current Mobile IPv6 model relies on the MN being assigned a static HoA, and this may not be the most efficient model for real large scale deployment, besides not allowing for dynamic HoA assignment as required in RFC 3041 or CGA.

SUMMARY OF THE INVENTION

For a solution to be considered valid and easily deployable for IPv6 mobility, it should not rely on the presence of any infrastructure (e.g. AAA—Authentication, Authorization and Accounting, see RFC 2977) but be based only on message exchanges between the mobile node (MN) and the Home Agent (HA).

The present invention provides an enhancement to Mobile IPv6 that allows a Mobile Node to dynamically configure one or more Home Addresses (HoA) and register said HoA(s) with a Home Agent in a secure manner, i.e., by ensuring that the MN is authorized to do so. The present invention uses the MN's NAI (Network Access Identity) to identify the MN. In particular, the present invention applies to the scenario where no AAA infrastructure is present.

The present invention provides the definition of two new messages for Mobile IPv6: Home Address Registration Request and Home Address Registration Response.

Thus, according to the first aspect of the present invention, a method of registering a home address of a mobile node with a home agent in a network. The method comprises the steps of:

conveying a request by the mobile node to the home agent requesting the registration of the home address;

authenticating the mobile node; and storing the home address of the mobile node in the home agent.

The method further comprises the step of obtaining the home address by the mobile node.

Preferably, the request includes a network access identity of the mobile node and the home address to be registered so as to allow the mobile node to be authenticated using security information based on the network access identity.

Advantageously, the mobile node and the home agent share a security association identified by the network access identity, and the mobile node is authenticated based on the security association.

Advantageously, the request also includes a mobile node authenticator for use in said authenticating step and the mobile node authenticator is for use in said authenticating step, and the mobile node authenticator is computed based on said security association.

Advantageously, the request also includes a care-of-address of the mobile node indicative of a current point of attachment to the network by the mobile node.

Advantageously, the method further comprises the step of sending authentication and key material to the mobile node so as to allow the mobile node to provide the home agent with a mobile node authentication based on the authentication and key material when said authenticating step requires a challenge-response procedure.

The mobile node is allowed to proceed with binding update messages based on the stored home address in the home agent when needed.

Advantageously, the method further comprises the step of associating a lifetime to the registered home address so as to limit the duration in which the mobile node is allowed to proceed with the binding update messages, wherein the lifetime can be refreshed when the mobile node proceeds with a binding update message, or freshed with a further request by the mobile node to the home agent.

Advantageously, the method of claim further comprises the step of authenticating the request using a hash function.

Advantageously, the method further comprises the step of storing a value indicative of the home address and a security parameter index in a security engine in the home agent so as to allow the home agent to authenticate a binding update message based on said stored value and the security parameter index.

Advantageously, the method further comprises the step of the mobile node providing proof that the mobile node owns and is authorized to use the home address or the care-of-address.

Advantageously, the home agent can be discovered by the mobile node in a discovery process and the registration of the home address is conveyed to the discovered home agent.

According to the second aspect of the present invention, there is provided a network system. The network system comprises:

at least a mobile node having a home address associated thereto, and a home agent, wherein the mobile node is adapted to send a request to the home agent requesting the registration of the home address, and the home agent is adapted to authenticate the mobile node and to store the home address of the mobile node in the home agent. The request includes a network access identity of the mobile node and the home address to be registered, so as to allow the home agent to authenticate the mobile node using security information based on the network access identity.

According to the third aspect of the present invention, there is provided a home agent in a network, the network comprising at least one mobile node having a home address to be registered with the home agent by sending a request to the home agent. The home agent comprises:

means, response to said request, for authenticating the mobile node; and means, response to said authentication, for storing the home address, wherein the request includes a network access identity of the mobile node and the home address to be registered, wherein the authenticating means authenticates the mobile node based on the network access identity.

According to the fourth aspect of the present invention, there is provided a mobile device in a network, the network comprising at least a home agent, the mobile device having a home address and a network access identity. The mobile device is characterized by sending a request to the home agent for registering the home address, wherein the request includes the network access identity so as to allow the home agent to authenticate the mobile device based on the network access identity.

The home agent can be discovered by the mobile device in a discovery process.

The mobile device is adapted to sending proof that the mobile device owns and is authorized to use the home address or the care-of-address when registering the home address with the home agent.

The present invention will become apparent upon reading the description taken in conjunction with FIGS. 1 to 4.

BEST MODE TO CARRY OUT THE INVENTION

It is assumed that a Security Association (SA) is shared between the Mobile Node (MN) and its home network (in particular the Home Agent (HA)). Such security association consists of a key or set of keys in the Mobile IPv6 engine to authenticate the MN based on the MN-Authenticator provided by the MN and the MN's NAI.

As mentioned above, the present invention is based on the idea that instead of using the MN's home address as the key element to identify the MN and retrieve the security parameters, the MN and the Home agent use the MN's NAI.

Figure 1:
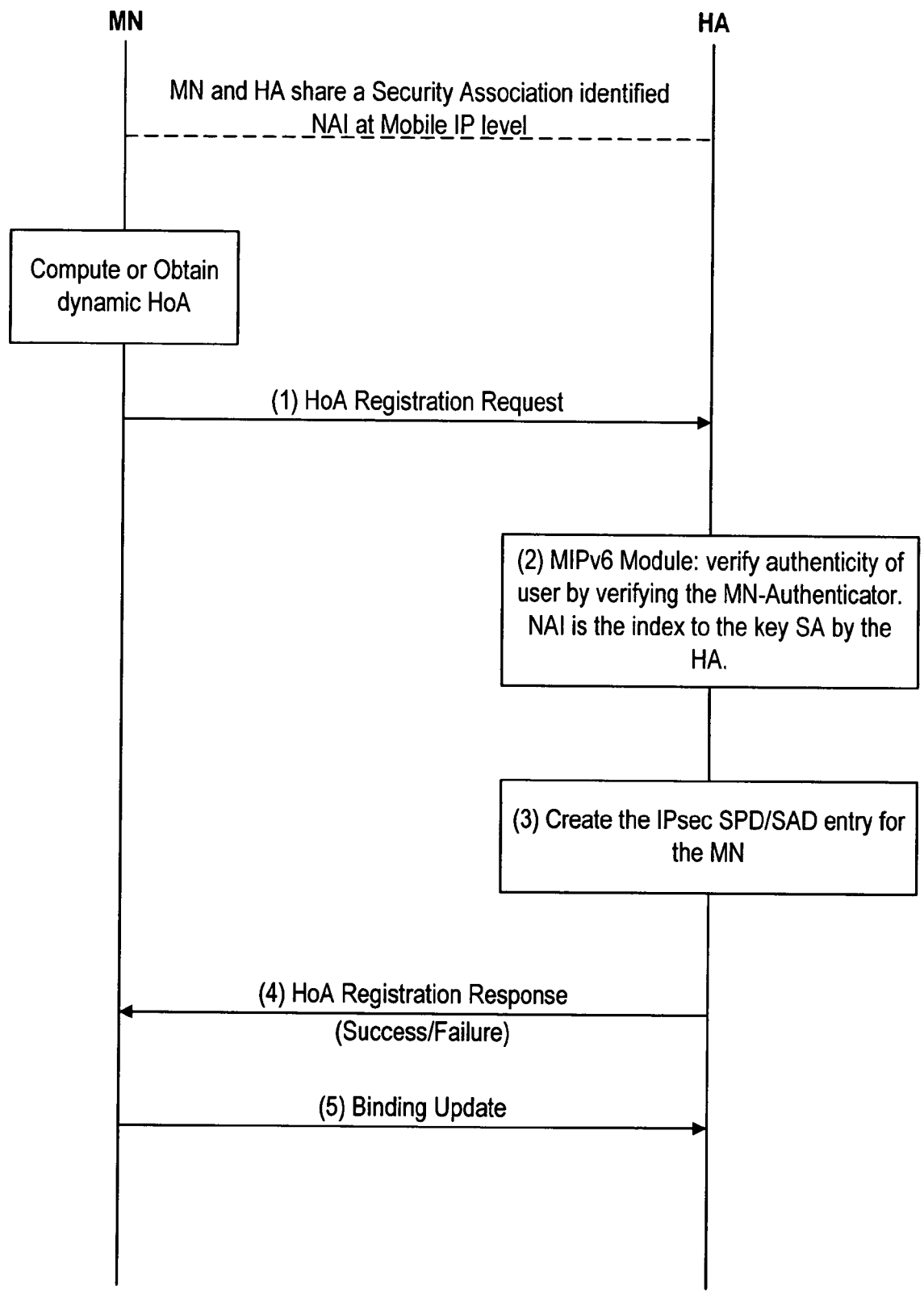
FIG. 1 is a block diagram illustrating a preferred HoA registration procedure, according to the present invention.
Figure 2:
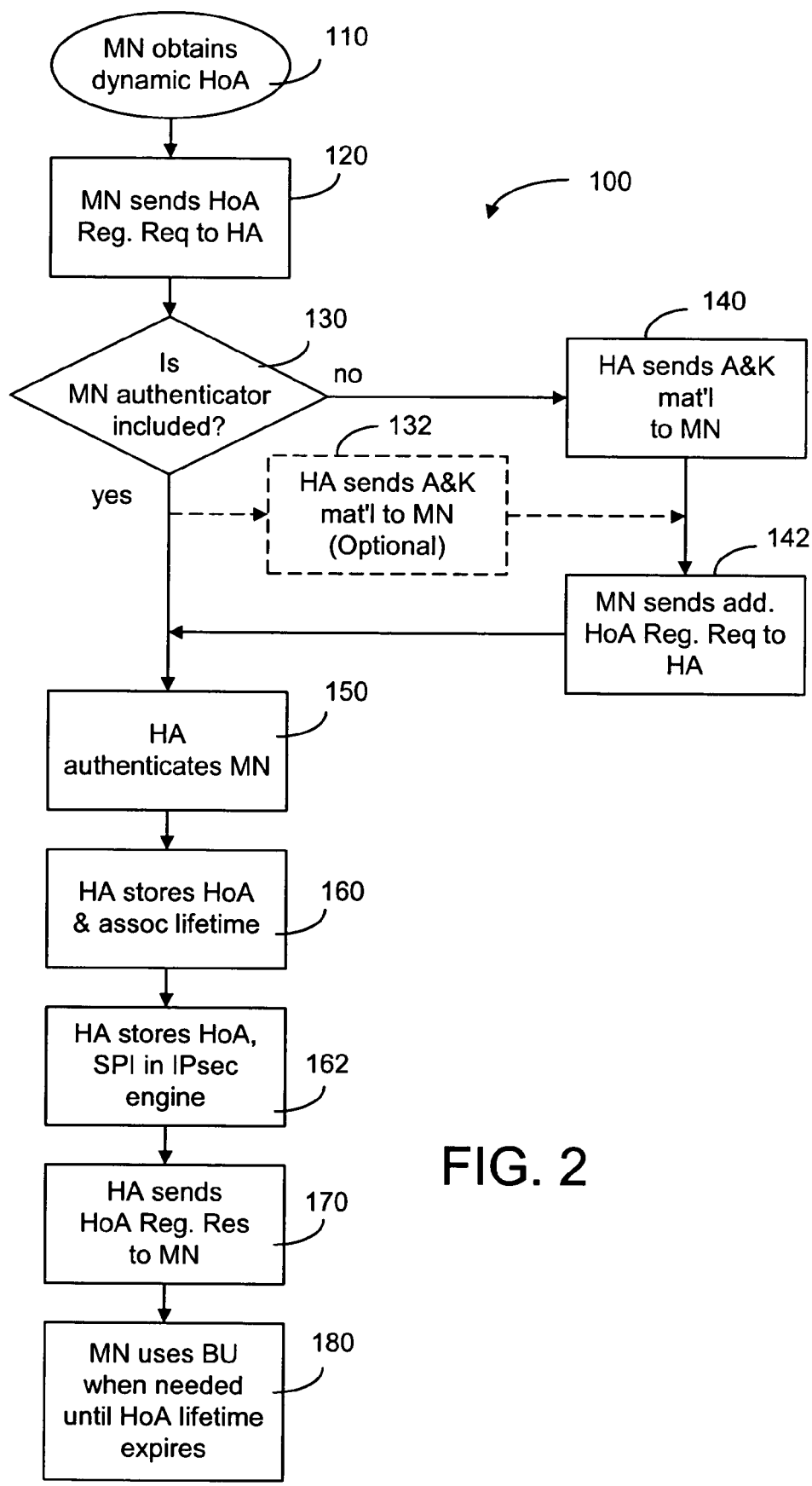
FIG. 2 is a flowchart illustrating the preferred HoA registration procedure.

As illustrated in FIGS. 1 and 2, the present invention is based on the following procedure:

After the creation of a new Home Address or HoA (i.e., in case the MN generates it or receives it from a network element) the MN may optionally discover a Home Agent in the home network. The generation or acquisition of the new HoA is shown at Step 110 of the flowchart 100 in FIG. 2.

The MN then sends an HoA Registration Request to the Home Agent, as shown at Step 1 in FIG. 1 and Step 120 in FIG. 2. The message contains:
   the MN's NAI,
   the MN's HoA,
   the MN's CoA, and possibly
   MN-Authenticator, wherein
      the MN's NAI is used to identify the user with the home network;
      the MN's HoA is a new address obtained by the MN and provided to the HA so as to allow the HA to know which IP address to defend and to create the necessary entry in the IPsec SPD (Security Policy Database);
      the MN's CoA is the address where the MN can be reached at its current point of attachment; and
      the MN-Authenticator is included by the MN so that the Registration Request can be authenticated by default by including a Message Authentication Code (MAC), which is obtained by applying a hash function with the (home domain)-(MN) shared key to the whole packet.

Upon receipt of the HoA Registration Request, the Mobile IP engine in the HA authenticates the MN by selecting the appropriate SA based on the NAI provided by the MN and by verifying the MN-Authenticator, as shown in Step 2 of FIG. 1 and Step 150 in the flowchart 100, if the MN-Authenticator is included in the HoA Registration Request.

If the MN-Authenticator is not included, as determined at Step 130 of the flowchart 100, the HA sends Authentication and Key Material to the MN in an HoA Registration Response message, at Step 140 of the flowchart 100, before completing the registration procedure. This step is carried out in order to authenticate the MN according to authentication mechanisms that require a challenge-response procedure, and/or to derive dynamic keys used e.g. for the authentication of future Binding Updates.

the HA may optionally send Authentication and Key Material to the MN in an HoA Registration Response message, at Step 132 of the flowchart 100, before completing the registration procedure. This step may be used to prevent replay attacks, for example, and to additionally authenticate the MN according to authentication mechanisms that require a challenge-response procedure, and/or to provide key material for the creation of a dynamic key between the MN and the HA for authentication of future Binding Update messages.

In response to the HoA Registration Response from the HA that contains an Authentication and Key Material, the MN sends an additional HoA Registration Request to the HA, at Step 142 of the flowchart 100, wherein the additional HoA Registration Request contains the same NAI, Home Address and Care-of Address as in Step 1 of FIG. 1, but also includes an MN-authenticator computed using the SA shared with the HA at the Mobile IP level and the Authentication and Key Material.

The Mobile IP engine in the HA authenticates the MN by selecting the appropriate SA based on the NAI provided by the MN and by verifying the MN-Authenticator, as shown at Step 160 of the flowchart 100.

The Mobile IP engine in the HA stores the HoA provided by the MN and associates a lifetime to the HoA, using the HoA Lifetime value suggested by the MN, at Step 160.

The HA creates the entry in the IPsec engine, at Step 162 in the flowchart 100, by setting the Source Address field value to the dynamic HoA provided by the MN, and the SPI value to either the pre-defined value known to HA and MN, or the value decided by the HA and returned to the MN.

The key(s) associated with this entry can be part of the SA shared by the HA and the MN or computed during the MN authentication (e.g. though a challenge-response procedure). This procedure allows future Binding Updates messages from the MN to be authenticated directly at the IPsec level.

The HA sends, at Step 170 in flowchart 100, an HoA Registration Response message to the MN indicating success or failure of the registration. The HA can also send a different value of the HoA Lifetime if the value proposed by the MN is not acceptable.

If the process is successful, the MN proceeds with Binding Update messages as needed, as shown at Step 180 in flowchart 100, before the HoA Lifetime expires.

When the HoA Lifetime in the HA has expired, the HA deletes:
the HoA associated to the MN,
any entry in the Mobile IP binding cache related to the HoA, and
the IPsec entry corresponding to the HoA.

However, the MN can refresh the lifetime of the HoA in two ways: by either sending a new HoA Registration Request before the expiration of the lifetime, or the HA can refresh it (i.e. re-start the timer) upon each Binding Update sent by the MN.

During the registration procedure, the MN can optionally provide additional information such as the proof that the MN owns and is authorized to use the claimed HoA and CoA (i.e. to solve IPv6 address ownership problem). This additional information proves that the MN owns the addresses. The way the MN computes such information is outside the scope of this invention.

All of the additional information carried in the HoA Registration messages (besides the NAI) can be encrypted to prevent any eavesdropper from performing traffic analysis or learning any other sensitive information. The MN's NAI can be used to retrieve the appropriate security keys to decrypt the message.

The present invention is applicable in many different scenarios, a few of which are shown below for demonstration purposes.

Scenario 1:

The HoA Registration Request and HoA Registration Response messages are new Mobile IP messages. A new Mobility Header Type allows this message to be differentiated from the other Mobile IP messages such as BU, HoTI (Home Test Initiation), CoT (Car-of Test), etc. In this scenario, HoA registration and Binding Update procedures are separate (i.e., executed independently and sequentially).

The HoA Registration Request should have at least the following fields:
Source IP address: CoA
Destination IP address: HA (or an anycast address— please see below)
Next Header: Mobility Header
Type: HoA Registration Request
Identification number: To match the requests and the responses
NAI
Home address option
MN-Authenticator This field is optional and should be included only if the authentication method according to the SA shared by the HA and the MN allows for the MN to compute the MN-Authenticator when first sending the request to the HA. The field is always included when the MN send the HoA Registration Request message to the HA in response to an HoA Registration Reply message from the HA containing Authentication and Key Material.
HoA Lifetime This field is optional, since there can be a pre-defined value specified at subscription time. MN can request a different lifetime value.
SPI: This field is optional and should be present only if the HA and the MN do not have a SPI value pre-defined at subscription for the IPsec security association that will be used to authenticate Binding Updates.

And the HoA Registration Response should have the following fields:
Source IP address: Home Agent
Destination IP address: CoA
Next Header Mobility Header
Type Registration Response
Identification number
Result code: Success/Failure
Authentication and Key Material: This field is optional and should only be present if either the MN-Authenticator was not provided by the MN in the request, or the Home Agent decides to further authenticate the MN to avoid replay attacks and/or by using a specific authentication method (e.g. challenge-response). The field can be used also by the HA to provide key material for the creation of a dynamic key between the MN and the HA for authentication of future Binding Update messages.

HoA Lifetime This field is optional and should only be present in case the HA does not accept the HoA Lifetime value proposed by the MN or the value pre-defined at subscription.

The HoA Registration Request message can be addressed to either the address of a Home Agent (if, for example, the MN is already pre-configured with a list of them) or to an any cast address: the second option allows to perform Home Agent Discovery and HoA registration at the same time, therefore optimizing the procedures.

There are different ways to implement this invention at the Home Agent, and some possible ways are described below. The invention could, however, also be implemented in a different manner.

Figure 3:
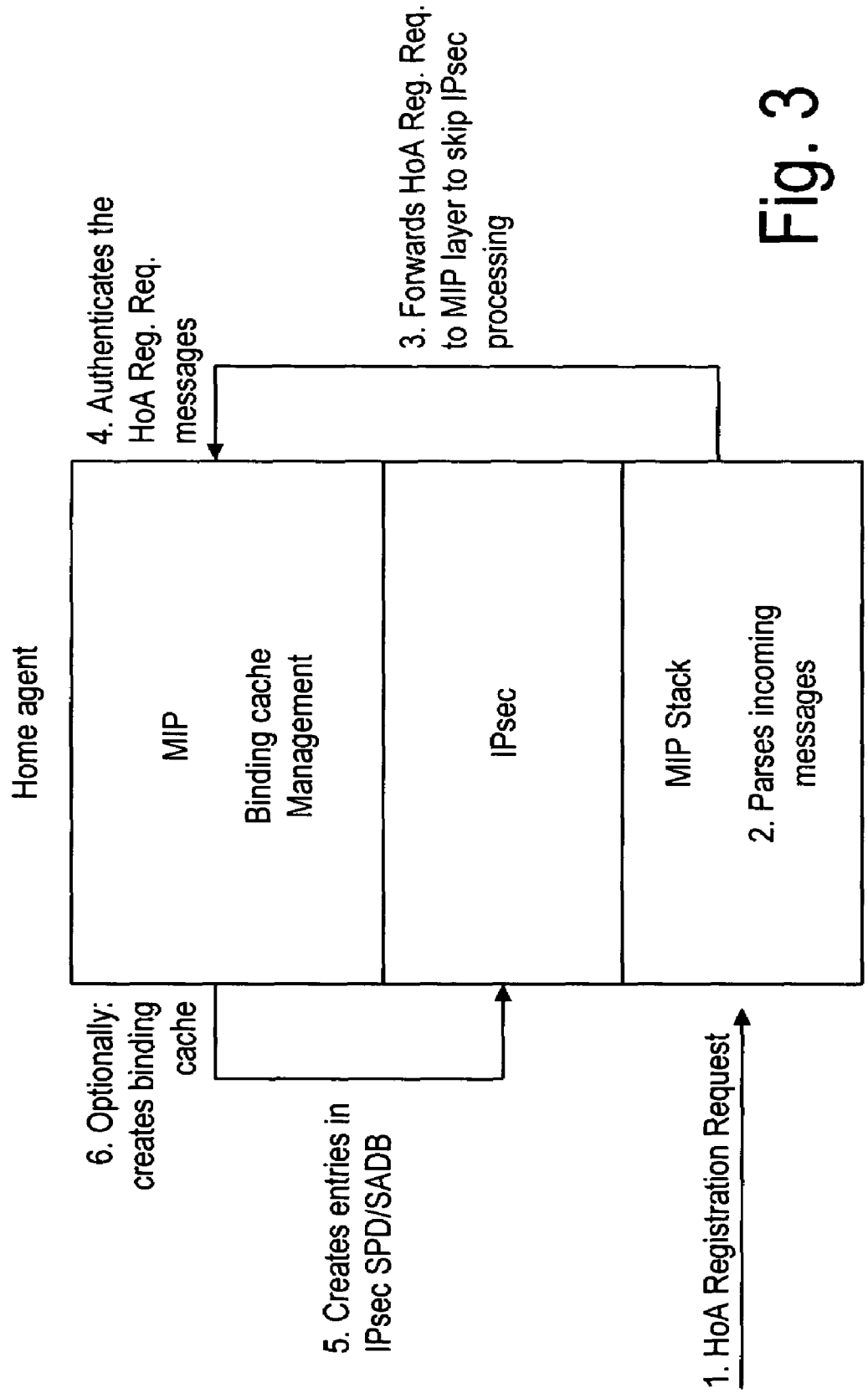
FIG. 3 is a block diagram illustrating a modified HoA registration procedure, according to the present invention.

Option 1—Modified Home Agent (FIG. 3)

In the same way the MIP stack currently makes some processing before forwarding the packet to the IPsec engine (when a Home Address option is present, the MIP stack substitutes the contents of the source address and home address option fields), when recognizing that the received packet is a Registration Request, thanks to the type number, the Mobile IP stack will directly process it without passing it to the IPsec engine. The MIP stack will verify the authenticity of the request and make sure the MN is authorized, and then will create an entry in the IPsec Security Policy Database for subsequent MIP messages from the MN to the HA (e.g. binding update)

This implementation of the invention requires some access to the MIP HA source code and could be implemented in the future HA to come. This is a long-term solution.

Figure 4:
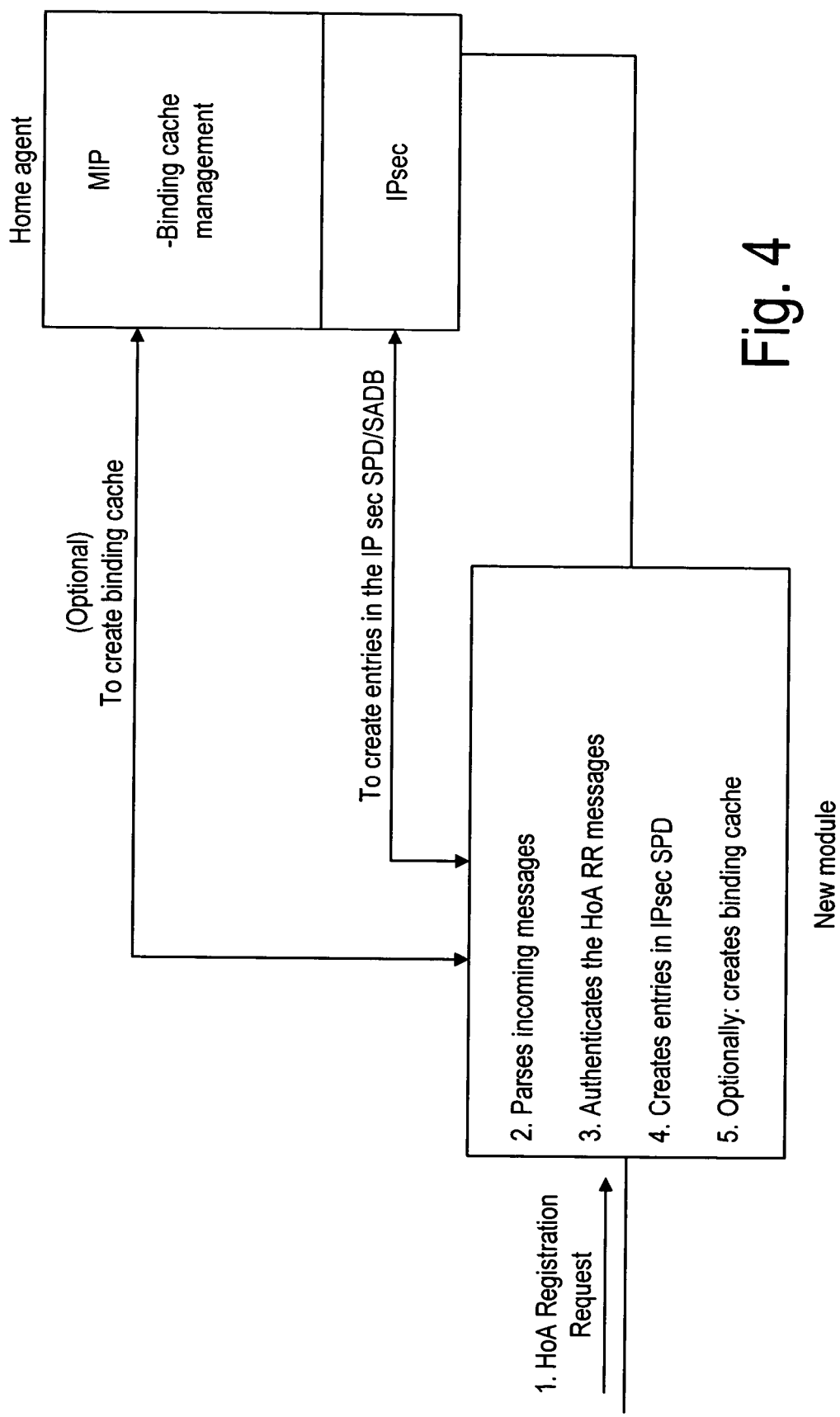
FIG. 4 is a block diagram illustrating yet another modified HoA registration procedure, according to the present invention.

Option 2—"Bump-in-the-stack" (FIG. 4)

For the already deployed HA, a "Bump-in-the-stack" (BITS) implementation, such as what happened when IPsec was being deployed and IPv4 stacks were already present [RFC 2401], could be a short term solution. The invention would be implemented "underneath" an existing implementation of a MIP HA/IPsec protocol stack, between the HA and the local network drivers. Source code access for the MIP HA stack is not required in this context but the BITS should be able to access the IPsec SPD. If the BITS can also access the HA Binding cache, some optimizations would be possible, and more particularly on receipt of the Registration Request message, the corresponding binding cache could be created. Otherwise, the MN would have to send a Binding update after the registration request.

This implementation approach is appropriate for use with legacy systems.

Option 3

This option considers the possibility of an enhanced implementation/version of the IPsec protocol. Currently, IPsec can differentiate the packets based on the source address, the destination address, the next header and the security parameters index: this information allows it to retrieve the appropriate security association and process the packets.

However, with the evolution of different protocols such as Mobile IP, it has been identified that this granularity is not enough: the next header only allows it to distinguish if it is a TCP, UDP, Hop by Hop, Mobility, or Routing Header, etc., but it would be beneficial to also be allowed to differentiate the packets based on the types: e.g., binding update, HoT, CoT, HoA Registration Request.

Either future IPsec versions will allow that, or Home agent can have an enhanced implementation of IPsec enabling this higher granularity selection.

In such cases, there will be two entries per MN in the SPD created upon subscription. One for the binding update, and one for the HoA Registration Request. This will limit the potential denial of service attacks (such as floodings) since every packet will first need to go through the IPsec engine.

The HoA Registration Request will be protected (authentication) using the Authentication Header protocol, and then authenticated based on the NAI; and if both verification pass, the entry corresponding to the binding update will be created in the IPsec SPD.

Scenario 2:

Binding Update and Binding Acknowledgment messages are extended to also perform HoA registration. In this scenario, the MA and HA share an SA at both IPsec level and MIP level. IPsec verifies authenticity of the message, whereas the MIP level verifies an MN-Authenticator the MN includes in the BU together with its NAI.

Scenario 3:

This is an extension of Scenario 1. As part of the HoA Registration Request processing after the authentication has passed, the corresponding binding cache would be created. This would avoid any binding update/binding acknowledgement response after the HoA Registration Response.

Advantages of the present invention are as follows:

In addition to being required for solutions like CGA, RFC 3041 to be deployable, this solution allows more flexibility to Mobile IPv6 (e.g., to cope with situations such as when the assigned HA goes down);

The solution can be implemented by simply defining two new messages for Mobile IPv6 in the IETF or by extending current Binding Update messages;

The procedure described in this invention will have to be performed when the MN changes Home Address, but it does not affect nor modify all the other procedures already defined in the Mobile IP specifications;

The invention does not require modification to IPsec in order to be deployable: this is a big advantage in terms of feasibility of standardization and deployability on the short-medium term;

No infrastructure is required (AAA, PKI (Public Key Infrastructure), etc.)

The solution can be integrated with Home Agent discovery in case the Home Agent is assigned dynamically in order to allow for optimization of signaling between the MN and the HA. This applies to the case where new registration messages are defined The procedure allows for different authentication mechanisms. For example, the MN can send in the Registration Request that an MN-authenticator computed as a function of the message itself and key(s) belonging to the SA the MN shares with the HA. Also, more complex authentication mechanisms could be used. For example, the HA may send an Authentication and Key Material to the MN that in turn the MN uses to provide a Response to be authenticated. This would allow authentication mechanisms such as the SIM-based challenge-response mechanisms adopted in GSM or UMTS AKA (Authentication and Key Agreement). This will be useful to allow the adoption of the invention in products such as OWLAN (Operator Wireless Local Area Network)

where the MN access to WLAN is authenticated through the HA by means of GSM challenge-response authentication.

The solution allows for anti-reply attacks and can limit the Denial of Service attacks (depending on the adopted authentication method, e.g., by using cookies)

In sum, the present invention provides a method of enhancing Mobile IPv6 in that the method allows a mobile node to dynamically configure one or more addresses and register the addresses with a home agent in a secure manner by ensuring that the mobile node is authorized to do so. The invention uses the network access identity of the mobile node to identify the mobile node. The network access identity is provided to a home agent in a home address registration request. Preferably, a mobile node authenticator is included in the registration request so as to allow the home agent to authenticate by mobile node based on the authenticator. After the authentication process, the home agent stores the provided home address of the mobile node in its IP security engine so that future binding update messages from the mobile node can be directly authenticated by the IP security level.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method comprising:
   conveying a request by a mobile node to a home agent in a network requesting registration of a home address of the mobile node with the home agent;
   authenticating the mobile node;
   storing in the home agent the home address to be registered, wherein the request includes a network access identity of the mobile node and the home address to be registered.

2. The method of claim 1, further comprising obtaining the home address by the mobile node.

3. The method of claim 1, wherein the mobile node is authenticated using security information based on the network access identity.

4. The method of claim 1, wherein the mobile node and the home agent share a security association identified by the network access identity, and the mobile node is authenticated based on the security association.

5. The method of claim 1, wherein the request also includes a mobile node authenticator for use in said authenticating.

6. The method of claim 4, wherein the request also includes a mobile node authenticator for use in said authenticating, and the mobile node authenticator is computed based on said security association.

7. The method of claim 1, wherein the request also includes a care-of-address of the mobile node indicative of a current point of attachment to the network by the mobile node.

8. The method of claim 1, further comprising
   sending authentication and key material to the mobile node so as to allow the mobile node to provide the home agent with a mobile node authentication based on the authentication and key material when said authenticating requires a challenge-response procedure.

9. The method of claim 1, wherein the mobile node is allowed to proceed with binding update messages based on the stored home address in the home agent when needed.

10. The method of claim 9, further comprising
    associating a lifetime to the registered home address so as to limit the duration in which the mobile node is allowed to proceed with the binding update messages.

11. The method of claim 10, wherein the lifetime can be refreshed when the mobile node proceeds with a binding update message.

12. The method of claim 10, wherein the lifetime can be refreshed with a further request by the mobile node to the home agent.

13. The method of claim 1, further comprising p1 authenticating the request using a hash function.

14. The method of claim 1, further comprising
    storing a value indicative of the home address and a security parameter index in a security engine in the home agent so as to allow the home agent to authenticate a binding update message based on said stored value and the security parameter index.

15. The method of claim 1, further comprising providing proof by the mobile node that the mobile node owns and is authorized to use the home address.

16. The method of claim 7, further comprising providing proof by the mobile node that the mobile node owns and is authorized to use the care-of-address.

17. The method of claim 1, wherein the home agent is discovered by the mobile node in a discovery process and the registration of the home address is conveyed to the discovered home agent.

18. A network comprising
    at least a mobile node having a home address associated thereto, and
    a home agent, wherein the mobile node is adapted to send a request to the home agent requesting the registration of the home address with the home agent, and the home agent is adapted to authenticate the mobile node and to store in the home agent the home address to be registered, wherein the request includes a network access identity of the mobile node and the home address to be registered.

19. The network of claim 18, wherein the home agent authenticates the mobile node using security information based on the network access identity.

20. The network of claim 18, wherein the mobile node and the home agent share a security association identifiable by the network access identity, and the home agent authenticates the mobile node based on the security association.

21. The network of claim 18, wherein the request includes a care-of-address of the mobile node indicative of a current point of attachment to the network by the mobile node.

22. A home agent in a network, comprising:
    means, response to a request from a mobile node requesting registration of a home address of the mobile node with the home agent, for authenticating the mobile node; and
    means, response to said authentication, for storing in the home agent the home address to be registered, wherein the request includes a network access identity of the mobile node and the home address to be registered.

23. The home agent of claim 22, wherein said authenticating means authenticates the mobile node based on the network access identity.

24. An apparatus comprising:
    means for sending a request to a home agent in a network for registering a home address of the apparatus with the home agent, wherein the request includes the network access identity and the home address to be registered so as to allow the home agent to authenticate the apparatus based on the network access identity.

25. The apparatus of claim 24, further comprising means for discovering the home agent in a discovery process.

26. The apparatus of claim 24, further adapted to sending proof that the apparatus owns and is authorized to use the home address when registering the home address with the home agent.

27. The apparatus of claim 24, wherein the request further includes a mobile device authenticator so as to allow the home agent to authenticate the apparatus based on the authenticator.

* * * * *

UNITED STATES PATENT AND TRADEMARK OFFICE
CERTIFICATE OF CORRECTION

PATENT NO.        : 7,636,569 B2                                              Page 1 of 1
APPLICATION NO.   : 10/609016
DATED             : December 22, 2009
INVENTOR(S)       : Franck Le, Stefano Faccin and Basavaraj Patil It is certified that error appears in the above-identified patent and that said Letters Patent is hereby corrected as shown below:

In column 10, line 11, which is claim 13, line 1, "$p_1$" should be deleted.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO.       : 7,636,569 B2                                                 Page 1 of 1
APPLICATION NO. : 10/609016
DATED            : December 22, 2009
INVENTOR(S)      : Le et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1933 days.

Signed and Sealed this

Twenty-first Day of December, 2010

David J. Kappos
*Director of the United States Patent and Trademark Office*